United States Patent
Liu et al.

(10) Patent No.: US 10,351,689 B2
(45) Date of Patent: Jul. 16, 2019

(54) VOIDED LATEX PARTICLES

(71) Applicant: Arkema Inc., King of Prussia, PA (US)

(72) Inventors: Lily Liu, Oak Ridge, TN (US); Wayne Devonport, Apex, NC (US); Daniel Edward Stark, Raleigh, NC (US); Matthew F. Boudreaux, Raleigh, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/504,375

(22) PCT Filed: Aug. 7, 2015

(86) PCT No.: PCT/US2015/044119
§ 371 (c)(1),
(2) Date: Feb. 16, 2017

(87) PCT Pub. No.: WO2016/028511
PCT Pub. Date: Feb. 25, 2016

(65) Prior Publication Data
US 2017/0240716 A1  Aug. 24, 2017

Related U.S. Application Data

(60) Provisional application No. 62/040,557, filed on Aug. 22, 2014.

(51) Int. Cl.
| | |
|---|---|
| *C08J 9/16* | (2006.01) |
| *C08J 9/224* | (2006.01) |
| *C08F 285/00* | (2006.01) |
| *C08F 6/00* | (2006.01) |
| *C08J 9/28* | (2006.01) |

(52) U.S. Cl.
CPC ............ *C08J 9/224* (2013.01); *C08F 6/006* (2013.01); *C08F 285/00* (2013.01); *C08J 9/16* (2013.01); *C08J 9/28* (2013.01); *C08J 2201/04* (2013.01); *C08J 2333/12* (2013.01); *C08J 2433/12* (2013.01)

(58) Field of Classification Search
CPC ..... C01B 33/12; C01F 7/021; C08G 65/4012; C08G 65/4093; C08G 2650/40; C08J 5/005; C08J 2371/12; C08J 9/16; C08J 9/224; C08J 9/28; C08J 2201/04; C08J 2333/12; C08J 2433/12; C08K 3/013; C08K 3/22; C08K 3/30; C08K 3/36; C08K 2003/2227; C08K 2003/325; C08L 71/00; C08L 71/10; C08F 285/00; C08F 6/006

See application file for complete search history.

(56) References Cited

U.S. PATENT DOCUMENTS

| | | | |
|---|---|---|---|
| 3,719,646 A | 3/1973 | Stecklen et al. | |
| 3,935,151 A | 1/1976 | Nickerson et al. | |
| 4,302,375 A | 11/1981 | Dixon et al. | |
| 4,319,032 A | 3/1982 | Sandri et al. | |
| 4,340,743 A | 7/1982 | Sandri et al. | |
| 4,427,836 A | 1/1984 | Kowalski et al. | |
| 4,429,095 A | 1/1984 | Sandri et al. | |
| 4,468,498 A | 8/1984 | Kowalski et al. | |
| 4,594,363 A | 6/1986 | Blankenship et al. | |
| 4,632,957 A | 12/1986 | Welsh et al. | |
| 4,783,539 A | 11/1988 | Abboud et al. | |
| 4,880,842 A | 11/1989 | Kowalski et al. | |
| 4,880,931 A | 11/1989 | Abboud et al. | |
| 4,882,873 A | 11/1989 | Purnell | |
| 4,920,160 A | 4/1990 | Chip et al. | |
| 4,985,469 A | 1/1991 | Chip et al. | |
| 5,216,044 A | 6/1993 | Hoshino et al. | |
| 5,229,209 A | 7/1993 | Gharapetian et al. | |
| 5,273,824 A | 12/1993 | Hoshino et al. | |
| 5,399,706 A | 3/1995 | Dochniak | |
| 5,496,907 A | 3/1996 | Dochniak | |
| 5,521,253 A | 5/1996 | Lee et al. | |
| 6,020,435 A | 2/2000 | Blankenship et al. | |
| 6,166,220 A | 12/2000 | Singh et al. | |
| 6,252,044 B1 | 6/2001 | Blankenship et al. | |
| 7,803,878 B2 | 9/2010 | Blankenship et al. | |
| 8,247,027 B2 | 8/2012 | Mukkamala et al. | |
| 2009/0162558 A1 | 6/2009 | Bardman et al. | |
| 2012/0245240 A1 | 9/2012 | Perez et al. | |
| 2012/0277098 A1 | 11/2012 | Mukkamala et al. | |

FOREIGN PATENT DOCUMENTS

WO   WO 2000/068304   11/2000

*Primary Examiner* — Irina S Zemel

(74) *Attorney, Agent, or Firm* — Lynn B. Morreale

(57) ABSTRACT

A process for forming voided latex particles is improved by combining swelling and polymerization of an outer shell into a single step. The process includes contacting multi-stage emulsion polymer particles comprising a core, at least one intermediate shell, with a swelling agent, and polymerizing an outer shell after said contacting with swelling agent wherein the core and the at least one intermediate shell are contacted with swelling agent in the presence of less than 0.5% monomer based on the weight of the multi-stage emulsion polymer particles, and substantially all of the swelling occurs during polymerization of the outer shell.

16 Claims, 2 Drawing Sheets

VOIDED LATEX PARTICLES

CROSS-REFERENCE TO RELATED APPLICATIONS

This application is a national stage application under 35 U.S.C. § 371 of PCT/US2015/044119 filed Aug. 7, 2015, which claims benefit to U.S. patent application Ser. No. 62/040,557, filed Aug. 22, 2014.

TECHNICAL FIELD

The present application relates to latex particles and emulsion polymerization processes for producing such particles. In particular, the present application relates to aqueous emulsion polymerization processes for preparing "hollow" or "voided" latex particles and the latex particles prepared therefrom, which are useful as non-film-forming opacifiers.

BACKGROUND OF THE INVENTION

Paints and coatings play an important role in preserving, protecting and beautifying the objects to which they are applied. Architectural paints are used to decorate and extend the service life of the interior and exterior surfaces of residential and commercial buildings.

"Hollow latexes" (i.e., voided latex particles) which are non-film-forming have been developed for use as opacifiers in paints and other coatings. As such, they are typically used as full or partial replacements for other opacifying agents such as titanium dioxide.

Known processes for preparing hollow polymer particles including a separate swelling step that occurs after polymerization of the core and shell layers or in between formation of shell layers requires specific timing of those steps that are difficult to carry out on a commercial plant scale. If the timing of these steps is not ideal, the final geometric structures of the particles are compromised. Timing of these steps may result in shell thickness, void diameter, particle size, and particle morphology (such as the formation of penetrating pores) that result in undesirable product performance.

SUMMARY OF THE INVENTION

The present invention provides a process for forming voided latex particles, wherein the process includes contacting multi-stage emulsion polymer particles comprising a core, at least one intermediate shell, with a swelling agent, and polymerizing an outer shell after said contacting with swelling agent wherein:

the core comprises a hydrophilic component;

the at least one intermediate shell comprises, as polymerized units, one or more hydrophilic monoethylenically unsaturated monomer, one or more nonionic monoethylenically unsaturated monomer, or mixtures thereof, the outer shell comprises a polymer having a Tg of at least 60° C., the core and the at least one intermediate shell are contacted with swelling agent in the presence of less than 0.5% monomer based on the weight of the multi-stage emulsion polymer particles, and;

substantially all of the swelling occurs during polymerization of the outer shell.

DETAILED DESCRIPTION OF THE INVENTION

Figure 1:
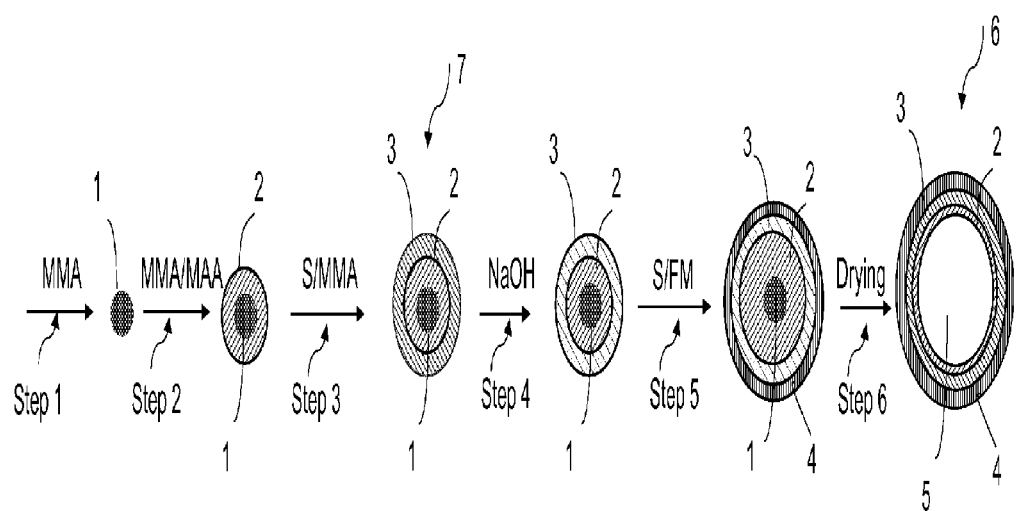
FIG. 1 illustrates in schematic form an exemplary process which can be used to obtain multi-stage emulsion polymer particles.
Figure 2:
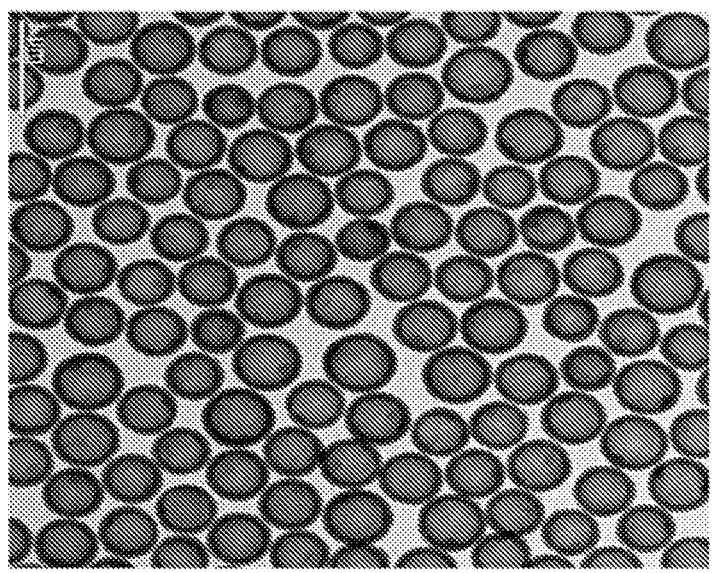
FIG. 2 is a typical scanning transmission electron micrograph (STEM) of particles made in accordance with the process described herein.

The process of the present invention avoids the timing issues associated with separate swelling and shell polymerization steps by adding swelling agent with less than 0.5% monomer present in the emulsion, and then adding the outer shell monomer such that substantially all of the swelling occurs during polymerization of the outer shell. We were thus unexpectedly able to conduct swelling during polymerization of the outer shell thereby avoiding the timing issues discussed above, while obtaining voided latex particles with desirable performance characteristics. Moreover, we were able to use more environmentally friendly swelling agents than those with volatile emissions such as ammonia.

The voided latex particles prepared by the process of the present invention may be characterized as being "non-film-forming." By "non-film-forming" it is meant that the voided latex particles will not form a film at ambient temperature or below, or in other words will only form a film at temperatures above ambient temperature. For the purposes of this specification, ambient temperature is taken as being in the range of 15° C. to 45° C. Thus, for example, when incorporated into an aqueous coating composition, applied to a substrate temperature and dried or cured at ambient temperature or below, the voided latex particles do not form a film. The voided latex particles generally remain as discrete particles in the dried or cured coating. The voided latex particles are capable of functioning as opacifiers; that is, when added in sufficient amount to a coating composition that would otherwise be transparent when dried, they render the dried coating composition opaque. By the term "opaque", it is meant that the refractive index of a coating composition has a higher refractive index when the voided latex particles of the present invention are present in a coating composition as compared to the same coating composition not including the voided latex particles of the present invention wherein the refractive index is measured after the coatings are dry to the touch. The term "outer shell polymer" refers to the outer layer of the particle of the present invention after swelling.

The voided latex particles prepared by the process of the invention generally comprise a hollow interior and an outer shell which encloses the hollow interior, although as will be explained subsequently in more detail one or more additional layers may be present between the outer shell and the interior void of each particle. Generally speaking, the voided latex particles may have a diameter of at least 200 nm, at least 250 nm, at least 300 nm, at least 350 nm, or at least 400 nm and a diameter of not more than 1200 nm, not more than 1000 nm, not more than 700 nm, not more than 650 nm, not more than 600 nm, not more than 550 nm, or not more than 500 nm. The hollow interior generally has a diameter of at least 100 nm, at least 150 nm, or at least 200 nm, but typically is not more than 1000 nm, not more than 800 nm, not more than 600 nm, not more than 500 nm or not more than 400 nm in diameter. The thickness of the layers surrounding the hollow interior, including the outer shell and also any additional layers which may be present, generally is from 30 to 120 nm. In some embodiments, the particles may have a diameter greater than 1200 nm with a hollow interior of a diameter greater than 1000 nm. Typically, the voided latex particles will be approximately spherical in shape, although oblong, oval, teardrop or other shapes are also possible. Particles with penetrating pores are undesirable and are not produced in any substantial quantity (e.g., less than 0.5% of particles on average) when practicing the process disclosed herein. Particle dimensions and morphology are determined by examining STEM images. The percentage of particles with penetrating pores, i.e., those with large pores visible in STEM images connecting the hollow core to the outer surface of the multi-stage emulsion polymer particles, are determined by counting particles with penetrating pores (if any) as visualized in STEM images as a percentage of the total particle count in a representative sample.

The process of the present invention includes a multi-stage emulsion polymerization process. The process includes formation of a core comprising a polymer of at least one hydrophilic monoethylenically unsaturated monomer, at least one intermediate shell, and an outer shell comprising an outer shell polymer. The multi-stage emulsion polymer particles may be contacted with a swelling agent, such as a base, which is capable of swelling the core, particularly in the presence of water. Unlike previously known processes, the process of the present invention combines swelling with polymerization of the outer shell. This is accomplished by adding swelling agent in the presence of less than 0.5% monomer based on the weight of the multi-stage emulsion polymer particles, and providing that substantially all of the swelling occurs during polymerization of the outer shell. As the term "substantially all of the swelling occurs during polymerization of the outer shell" is used, it is meant that the majority of swelling occurs during polymerization of the outer shell and that little or no swelling occurs during the addition of swelling agent in the presence of less than 0.5% monomer based on the weight of the multi-stage emulsion polymer particles. In some embodiments, less than 10%, or less than 5% of swelling will occur during addition of swelling agent, with the remainder occurring during polymerization of the outer shell. The percentage of swelling occurring during formation of the outer shell as compared to the addition of swelling agent is determined by comparing average size of the hollow cores as observed in STEM images of the multi-stage emulsion polymer particles obtained after addition of swelling agent as compared to the size of the hollow cores of multi-stage emulsion polymer particles obtained after addition of the outer layer. In some embodiments, the swelling agent can be added prior to formation of an intermediate layer and swelling can be conducted during formation of the intermediate layer and an outer layer may be added after swelling.

A monomer level of less than 0.5% monomer during addition of the swelling agent may be achieved by adding a sufficient amount of polymerization initiator prior to contacting with swelling agent to reduce the amount of monomer present during the contacting with swelling agent to less than 0.5% monomer based on the weight of the multi-stage emulsion polymer particles. Other methods of inducing polymerization may also be used. Swelling is substantially avoided during addition of the swelling agent and until the outer shell monomer is added by selecting an intermediate layer and swelling agent combination that minimizes penetration of the swelling agent to the core of the multi-stage emulsion polymer particles. For example, one or more intermediate layer may be crosslinked by addition of a crosslinking agent and a swelling agent including sodium may be used. It is preferred that polymerization inhibitors are avoided.

The swollen core causes the intermediate and outer shells to expand, such that when the polymer particles are subsequently dried and/or re-acidified the shells remains enlarged in volume and a void is created within the particle as a result of the shrinkage of the swollen core. The voided latex particles may each contain a single void. However, in other embodiments of the invention, the individual voided latex particles may contain a plurality of voids (e.g., a voided latex particle may contain two or more voids within the particle). The voids may be connected to each other through pores or other passageways. The voids may be substantially spherical in shape, but may adopt other forms such as void channels, interpenetrating networks of void and polymer, or sponge-like structures.

The process of the present invention may be performed by using a batch process where the product of one stage is used in the stage that follows. For instance, the product of the core stage may be used to prepare the product of the next stage, be it an outer shell or an intermediate encapsulating polymer stage. Similarly, the shell stage is prepared from the product of the core stage or, when there are one or more encapsulating polymer stages, an intermediate encapsulating polymer stage.

The core component of the multi-stage emulsion polymer particles is generally located at or near the center of such particles. However, in one embodiment, the core may coat and surround a seed which is comprised of a polymer different from the polymer used to prepare the core. In this embodiment, for example, the seed may comprise a polymer which is non-hydrophilic in character; i.e., the seed polymer may be a homopolymer or copolymer of one or more non-ionic monoethylenically unsaturated monomers such as methyl methacrylate. In one embodiment, the seed polymer is a methyl methacrylate homopolymer which is resistant to swelling by the swelling agent used to swell the core. The seed typically has a particle size of from about 30 to about 200 nm or from about 50 to about 100 nm. To form the core, the seed may be coated with another polymer which is comprised of at least one hydrophilic monoethylenically unsaturated monomer, optionally in combination with at least one non-hydrophilic monoethylenically unsaturated monomer such as an alkyl (meth)acrylate and/or a vinyl aromatic monomer. Sufficient hydrophilic monoethylenically unsaturated monomer should be used, however, such that the resulting polymer is capable of being swollen with a swelling agent such as an aqueous base. In one embodiment, for example, the polymer used to coat the seed and provide the core component is a copolymer of methyl methacrylate and methacrylic acid, the methacrylic acid content of the copolymer being about 30 to about 60 weight percent.

The core comprises a hydrophilic component that provides a sufficient degree of swelling for hollow or void formation. In some embodiments, the hydrophilic component is provided in the form of a hydrophilic monomer used to prepare the core polymer (i.e., a polymer used to obtain the core includes polymerized units of a hydrophilic monomer, in an amount effective to render the core polymer hydrophilic). In other embodiments, the hydrophilic component is an additive to the core (for example, the hydrophilic component may be admixed with a non-hydrophilic polymer). In further embodiments, the hydrophilic component is present both as an additive embedded in the core and as a hydrophilic polymer which is part of the core. In some embodiments, the hydrophilic component is an acid-containing monomer or additive, such as a monomer or additive bearing carboxylic acid functional groups.

In some embodiments, one or more of the polymers used to prepare the core may be converted to a swellable component after the polymer has already been prepared. For example, a polymer containing vinyl acetate units may be hydrolyzed to form a core polymer containing sufficient hydroxy groups such that the polymer is swellable.

The hydrophilic component of the core may be provided by polymerization or copolymerization of one or more monoethylenically unsaturated monomers bearing a hydrophilic functional group such as a carboxylic acid group or some other type of ionizable functional group. In some embodiments, such a monoethylenically unsaturated monomer is co-polymerized with at least one nonionic monoethylenically unsaturated monomer.

Examples of hydrophilic monoethylenically unsaturated monomers useful for making the core polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. In certain embodiments, the hydrophilic monoethylenically unsaturated monomer is acrylic acid or methacrylic acid.

Examples of hydrophilic non-polymeric components that may be present in the core include compounds containing one or more carboxylic acid groups such as aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

The hydrophilic monoethylenically unsaturated monomer may be present in the core polymer in amounts of, as polymerized units, from about 5 to about 80, from about 10 to about 80, from about 20 to about 80, from about 30 to about 70, from about 30 to about 60, from about 40 to about 60, or from about 30 to about 50, percent by weight, based on the weight of core polymer.

The core polymer may additionally contain recurring units derived from non-ionic monomers. Examples of non-ionic monomers that may be present in polymerized form in the swellable core polymer include vinyl aromatic monomers such as styrene, α-methyl styrene, p-methyl styrene, t-butyl styrene, or vinyltoluene, olefins such as ethylene, vinyl acetate, vinyl chloride, vinylidene chloride, (meth) acrylonitrile, (meth)acrylamide, ($C_1$-$C_{20}$) alkyl or ($C_3$-$C_{20}$) alkenyl esters of (meth)acrylic acid, such as methyl (meth) acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like.

The core polymer may further contain polyethylenically unsaturated monomer in amounts, as polymerized units, of 0.1 to 20 percent. Examples of suitable polyethylenically unsaturated monomers include co-monomers containing at least two polymerizable vinylidene groups such as α,β-ethylenically unsaturated monocarboxylic acid esters of polyhydric alcohols containing 2-6 ester groups. Such co-monomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

The multi-stage emulsion polymer particles may contain one or more intermediate encapsulating polymer layers. The intermediate encapsulating polymers partially or fully encapsulate the core. Each encapsulating polymer layer may be partially or fully encapsulated by another encapsulating polymer layer. Each encapsulating polymer layer may be prepared by conducting an emulsion polymerization in the presence of the core or a core encapsulated by one or more encapsulating polymers. The intermediate encapsulating polymer layer may function as a compatiblizing layer, sometimes referred to as a tie or tie coat layer, between other layers of the multi-stage emulsion polymer particles; for example, an intermediate encapsulating polymer layer may help adhere the outer shell to the core. An intermediate encapsulating polymer layer may also serve to modify certain characteristics of the final voided latex particles.

At least one intermediate encapsulating polymer may contain, as polymerized units, one or more hydrophilic monoethylenically unsaturated monomers and one or more nonionic monoethylenically unsaturated monomers. The hydrophilic monoethylenically unsaturated monomers and the nonionic monoethylenically unsaturated monomers useful for making the core are also useful for making such an intermediate encapsulating polymer. Generally, however, the intermediate encapsulating polymer contains a lower proportion of hydrophilic monomer than the core polymer, such that the intermediate encapsulating polymer swells less when contacted with the swelling agent. Other intermediate encapsulating polymers may contain, as polymerized units, non-ionic monoethylenically unsaturated monomer and little or no (e.g., less than 5 weight %) hydrophilic monoethylenically unsaturated monomer. Intermediate encapsulating polymers may further include crosslinking agents such as alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates;

dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

The outer shell is polymeric and may, for example, be comprised of a thermoplastic polymer. The outer shell polymer has a glass transition temperature (Tg) above ambient temperature, typically at least 60° C., at least 70° C., at least 80° C. or at least about 90° C. The Tg of the outer shell polymer may be, for example, from 60° C. to 140° C. Although the outer shell polymer may be a homopolymer, more typically it will be a copolymer comprised of recurring polymerized units of two or more different monomers, especially ethylenically unsaturated monomers such as those capable of being polymerized by free radical polymerization. The outer shell polymer is further characterized by bearing one or more different types of functional groups, particularly reactive, polar, chelating and/or heteroatom-containing functional groups. These functional groups may be varied and chosen as desired to modify certain characteristics of the voided latex particles, such as the wet adhesion, scrub resistance (washability), stain resistance, solvent resistance and block resistance properties of a coating composition which includes the voided latex particles. For example, the functional groups may be selected from 1,3-diketo, amino, ureido and urea functional groups and combinations thereof. Suitable 1,3-diketo functional groups include acetoacetate functional groups, which may correspond to the general structure —OC(=O)CH$_2$C(=O)CH$_3$. Suitable amino functional groups include primary, secondary and tertiary amine groups. The amino functional group may be present in the form of a heterocyclic ring. The amino functional group may, for example, be an oxazoline ring. Other types of functional groups useful in the present invention include, for example, hydroxyl (—OH), silane (e.g., trialkoxysilyl, —Si(OH)$_3$), phosphate (e.g., PO$_3$H and salts thereof), fluorocarbon (e.g., perfluoroalkyl such as trifluoromethyl), polyether (e.g., polyoxyethylene, polyoxypropylene), and epoxy (e.g., glycidyl). In one embodiment, the functional group contains a Lewis base such as the nitrogen atom of an amine. In another embodiment, the functional group contains a hydroxyl functional group. The functional group may be reactive; for example, the functional group may be capable of reacting as an electrophile or a nucleophile. The functional group, or a combination of functional groups in proximity to each other, may be capable of complexation or chelation.

The functional groups may be introduced into the outer shell polymer by different means. In one embodiment, the functional groups are introduced into the outer shell polymer during formation of the polymer, for example by polymerization of one or more polymerizable monomers bearing the desired functional groups (hereinafter "functionalized monomer"). Such polymerization may be carried out as a copolymerization wherein one or more functionalized monomers are copolymerized with one or more non-functionalized monomers. The monomers having functional groups described herein may be added at any stage in the preparation of the multi-stage emulsion provided that polymers bearing such functional groups at least partially or completely reside in the outer shell polymer of the particles after swelling.

For example, the outer shell polymer may be a copolymer of a vinyl aromatic monomer (e.g., styrene) and a free radical polymerizable ethylenically unsaturated monomer containing a functional group such as a-1,3-diketo, amino, ureido, urea, hydroxyl, silane, fluorocarbon, aldehyde, ketone, phosphate or polyether functional group. The copolymer may contain one or more other additional types of comonomers, such as alkyl (meth)acrylates (e.g., methyl methacrylate). The proportions of different monomers may be varied as may be desired to impart certain characteristics to the resulting outer shell polymer. Typically, the copolymer contains from 0.1 to 10 weight % of free radical polymerizable ethylenically unsaturated monomer(s) containing the functional group(s). Such a copolymer may further comprise 80-99.9 weight % of a vinyl aromatic monomer such as styrene and 0-10 weight % (e.g., 0.1-10 weight %) of an alkyl (meth)acrylate such as methyl methacrylate.

The free radical polymerizable ethylenically unsaturated monomer may contain a (meth)acrylate (i.e., acrylate or methacrylate) group or a (meth)acrylamide (i.e., acrylamide or methacrylamide) group. Such (meth)acrylate and (meth)acrylamide groups are capable of participating in free radical copolymerization with the vinyl aromatic monomer. Allylic groups may also be used to provide a polymerizable site of unsaturation.

Imidazolidinone (meth)acrylic monomers such as 2-(2-oxo-1-imidazolidinyl)ethyl (meth)acrylates and N-(2-(2-oxo-1-imidazolidinyl)ethyl (meth)acrylamides may be utilized as comonomers, for example. Other suitable free radical polymerizable ethylenically unsaturated monomers containing functional groups useful in the practice of the present invention include, without limitation, acetoacetoxy (meth)acrylates (e.g., acetoacetoxyethyl methacrylate, AAEM), allyl acetoacetate, derivitized methacrylamides such as methyloxalated diacetone (meth)acrylamides, aminoalkyl(meth)acrylates (including dialkyl and monoalkyl aminoethyl(meth)acrylates), and ethylenically unsaturated polymerizable aziridinyl monomers (such as those described, for example, in U.S. Pat. No. 3,719,646, incorporated herein by reference in its entirety for all purposes). Other suitable free radical polymerizable ethylenically unsaturated monomers containing useful functional groups include hydroethylethylene urea methacrylate (HEEUMA) and aminoethylethylene urea methacrylate (AEEUMA). The free radical polymerizable ethylenically unsaturated monomer may contain a plurality of functional groups on each monomer molecule; for example, the monomer may bear two or more urea and/or ureido groups per molecule, such as the compounds described in U.S. Pat. No. 6,166,220 (incorporated herein by reference in its entirety for all purposes). Illustrative examples of particular free radical polymerizable ethylenically unsaturated monomers suitable for use in the present invention as functionalized monomers include, but are not limited to, aminoethyl acrylate and methacrylate, dimethylaminopropylacrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl)acrylamide and methacrylamide, N-(3-dimethylamino-2,2-dimethylpropyl)acrylamide and methacrylamide, N-dimethylaminomethyl acrylamide and methacrylamide, N-(4-morpholino-methyl)acrylamide and methacrylamide, vinylimidazole, vinylpyrrolidone, N-(2-methacryloyloxyethyl)ethylene urea, N-(2-methacryloxyacetamidoethyl)-N, allylalkyl ethylene urea, N-methacrylamidomethyl urea, N-methacryloyl urea, 2-(1-imidazolyl)ethyl methacrylate, 2-(1-imidazolidin-2-on)ethylmethacrylate, N-(methacrylamido)ethyl urea, glycidyl (meth)acrylates, hydroxyalkyl (meth)acrylates such as 2-hydroxyethyl(meth)acrylates, gamma-(meth)acryloxypropyltrialkoxysilanes, N,N-dimethyl(meth)acrylamides, diacetone(meth)acrylamides, ethylene glycol (meth)acrylate phosphates, polyethylene glycol (meth)acrylates, polyethylene glycol methyl ether (meth)acrylates, diethylene glycol (meth)acrylates and combinations thereof.

In another embodiment of the invention, a precursor polymer is first prepared and then reacted so as to introduce the desired functional groups and thus provide the outer shell polymer. For example, amine functional groups may be introduced to the outer shell polymer by reacting a precursor polymer bearing carboxylic acid groups with an aziridine. In this example, the precursor polymer may be a polymer prepared by polymerizing an ethylenically unsaturated carboxylic acid such as (meth)acrylic acid, optionally together with other monomers such as alkyl (meth)acrylates and/or vinyl aromatic monomers (e.g., styrene).

The free radical initiators suitable for the polymerization of the monomers used to prepare the multi-stage emulsion polymer particles may be any water soluble initiator suitable for aqueous emulsion polymerization. Examples of free radical initiators suitable for the preparation of the multi-stage emulsion polymer particles of the present application include hydrogen peroxide, tert-butyl peroxide, alkali metal persulfates such as sodium, potassium and lithium persulfate, ammonium persulfate, and mixtures of such initiators with a reducing agent. The amount of initiator may be, for example, from 0.01 to 3 percent by weight, based on the total amount of monomer.

In some embodiments, a redox polymerization initiator system is used. In a redox free radical initiation system, a reducing agent may be used in conjunction with an oxidant. Reducing agents suitable for the aqueous emulsion polymerization include sulfites (e.g., alkali metal metabisulfite, hydrosulfite, and hyposulfite). In some embodiments, sugars (such as ascorbic acid and isoascorbic acid or an alkali metal (iso)ascorbate salt) might also be a suitable reducing agent for the aqueous emulsion polymerization.

In a redox system, the amount of reducing agent may be, for example, from 0.01 to 3 percent by weight based on the total amount of monomer.

Oxidizing agents include, for example, for example, hydrogen peroxide and ammonium or alkali metal persulfates, perborates, peracetates, peroxides, and percarbonates and a water-insoluble oxidizing agent such as, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. The amount of oxidizing agent may be, for example, from 0.01 to 3 percent by weight, based on the total amount of monomer.

The free radical polymerization temperature typically is in the range of about 10° C. to 100° C. In the case of the persulfate systems, the temperature may be in the range of about 60° C. to about 100° C. In the redox system, the temperature may be in the range of about 30° C. to about 100° C., in the range of about 30° C. to about 60° C., or in the range of about 30° C. to about 45° C. The type and amount of initiator may be the same or different in the various stages of the multi-stage polymerization.

One or more nonionic or ionic (e.g., cationic, anionic) emulsifiers, or surfactants, may be used, either alone or together, during polymerization in order to emulsify the monomers and/or to keep the resulting polymer particles in dispersed or emulsified form. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether. Examples of suitable ionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, palmitic acid, palmitoleic acid, stearic acid, oleic acid, linoleic acid, linolenic acid, mixtures of fatty acids (e.g., linseed oil fatty acid), sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium α-olefin $(C_{14}-C_{16})$sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

The one or more emulsifiers or surfactants are generally used at a level of from zero to 3 percent based on the weight of the monomers. The one or more emulsifiers or surfactants can be added prior to the addition of any monomer charge, during the addition of a monomer charge or a combination thereof.

Suitable swelling agents are generally bases, including volatile bases such as ammonia, ammonium hydroxide, and volatile lower aliphatic amines, such as morpholine, trimethylamine, and triethylamine, carbonates, hydrogen carbonates and the like. Fixed or permanent bases such as sodium hydroxide, potassium hydroxide, lithium hydroxide, zinc ammonium complex, copper ammonium complex, silver ammonium complex, strontium hydroxide, barium hydroxide and the like may also be used. Solvents, such as, for example, ethanol, hexanol, octanol, and Texanol® solvent and those described in U.S. Pat. No. 4,594,363, may be added to aid in fixed or permanent base penetration. In some embodiments, the swelling agent is ammonia or ammonium hydroxide. An alkali metal hydroxide such as sodium hydroxide is preferred for lack of volatile emissions. The swelling agent may be in the form of an aqueous liquid or a gaseous medium containing a volatile base. The compositions of the outer shell and any intermediate encapsulating layers may be selected so as to be permeable to the swelling agent at ambient temperature or at a moderately elevated temperature. In one embodiment, the swelling agent is contacted with the multi-stage emulsion polymer particles at a temperature somewhat less than the glass transition temperature of the outer shell polymer. For example, the contacting temperature may be 5 to 20, 10 to 30, or 5-40° C. less than the outer shell polymer Tg.

The hydrophilic component of the core swells when the multi-stage emulsion polymer particles are subjected to a basic swelling agent that permeates the intermediate shells of the multi-stage emulsion polymer particles in the presence of the outer shell polymerizing monomer. In one embodiment of the invention, the hydrophilic component of the core is acidic (having a pH less than 6). Treatment with a basic swelling agent in the presence of the outer shell polymerizing monomer neutralizes the acidity and raises the pH of the hydrophilic component greater than 6, or at least about 7, or to at least about 8, or at least about 9, or at least about 10, or to at least about 13, thereby causing swelling by hydration of the hydrophilic component of the core. The swelling, or expansion, of the core may involve partial merging of the outer periphery of the core into the pores of the inner periphery of the layer immediately adjacent to the core (such as the outer shell or an intermediate encapsulating shell) and also partial enlargement or bulging of such adjacent layer and the entire particle overall.

The weight ratio of the core to the outer shell may generally, for example, be in the range of from 1:5 to 1:20 (e.g., from 1:8 to 1:15). To decrease the dry density of the final voided latex particles, the amount of outer shell relative to the amount of core should generally be decreased; however, sufficient outer shell should be present such that the core is still encapsulated.

Methods previously described in the art for producing voided latex particles may adapted for use in the present invention, provided the processes are modified to include addition of swelling agent in the presence of less than 0.5% monomer based on the weight of the multi-stage emulsion polymer particles, and; substantially all of the swelling occurs during polymerization of the outer shell. Previously known methods subject to such modification may include those described, for example, in U.S. Pat. Nos. 4,427,836; 4,468,498; 4,594,363; 4,880,842; 4,920,160; 4,985,469; 5,216,044; 5,229,209; and 5,273,824, each of which is incorporated herein by reference in its entirety for all purposes. For example, particles in accordance with the present invention may be made by incorporating the functional monomers described herein into the outer shell of the particles described in the following examples: (1) examples 0-14 of U.S. Pat. No. 4,427,836, (2) examples 0-12 of U.S. Pat. No. 4,468,498, (3) examples 1-4 of U.S. Pat. No. 4,594,363, (4) examples I-IX of U.S. Pat. No. 4,880,842, (5) examples 1-13 of U.S. Pat. No. 4,920,160, (6) examples 1-7 of U.S. Pat. No. 4,985,469, (7) examples 1-7 of U.S. Pat. No. 5,216,044, (8) examples 1-8 of U.S. Pat. No. 5,229,209, and (9) examples 1-50 of U.S. Pat. No. 5,273,824.

FIG. 1 illustrates in schematic form an exemplary process which can be used to prepare multi-stage emulsion polymer particles and voided latex particles in accordance with the invention. In Step 1, methyl methacrylate (MMA) is homopolymerized to form seed 1 as a small particle comprised of polymethyl methacrylate. Seed 1 is coated with a layer of methyl methacrylate/methacrylic acid copolymer by copolymerization of methyl methacrylate (MMA) monomer and methacrylic acid (MAA) monomer to provide core 2 (Step 2). In Step 3, encapsulating polymer layer 3 is formed by copolymerization of styrene (S) monomer and methyl methacrylate (MMA) monomer. During the formation of encapsulating layer 3, polymerization initiator is added prior to addition of swelling agent to reduce the amount of monomer present to less than 0.5% monomer based on the weight of the multi-stage emulsion polymer particles. A multi-stage emulsion polymer particle 7 is obtained following Step 3. Multi-stage emulsion polymer particle 7 is contacted with aqueous sodium hydroxide in Step 4. Although sodium hydroxide is added during step 4, substantially all of the swelling of the particle occurs during polymerization of monomer in step 5. The sodium hydroxide acts as a swelling agent during copolymerization of styrene (S) monomer or copolymerization of styrene monomer and a functionalized monomer (S/FM) such as an imidazolidinone (meth)acrylic monomer. The carboxylic acid functional groups of the MMA/MAA copolymer of core 2 are at least partially neutralized and core 2 swells in volume as a result of absorption of water by neutralized core 2. The volume increase of core 2 pushes encapsulating polymer layer 3 and outer shell 4 outwardly and the overall diameter of the multi-stage emulsion polymer particle increases. Drying the particles in Step 6 provides voided latex particle 6. Voided latex particle 6 is characterized by having an outer shell 4 surrounding hollow interior 5. Residues of seed 1 and core 2 may still be present within hollow interior 5. In this embodiment, encapsulating polymer layer 3 is capable of functioning as a tie-coat between core 2 and outer shell 4, which is formed in Step 4 by copolymerization of styrene (S) monomer and a functionalized monomer (FM) such as an imidazolidinone (meth)acrylic monomer. In other embodiments, the functionalized monomer may be omitted, and encapsulating polymer layer 3 may be omitted. More than one encapsulating polymer layer between core layer 2 and outer shell 4 may be present, if so desired.

The voided latex particles in accordance with the present invention are useful in coating compositions, such as aqueous-based paint and paper coatings. Voided latex particles in accordance with this invention may be capable of imparting improved gloss, brightness and opacity to paper coating formulations to which they are added. Also, voided latex particles in accordance with this invention may be capable of imparting opacity to aqueous coating compositions, such as paints, to which they are added. In addition, the wet adhesion of coating compositions can be improved by including voided latex particles in accordance with this invention, especially where the outer shell polymer contains functional groups selected from 1,3-diketo, amino, ureido and urea functional groups.

For example, a coating composition may contain, in addition to water, voided latex particles in accordance with this invention, one or more film-forming latex polymers (e.g., an acrylic (A/A) latex and/or a vinyl acrylic (V/A) latex), and, if so desired, any of the additives or other components typically employed in such latex coating compositions such as coalescing solvents, biocides, pigments, fillers, opacifying agents other than the voided latex particles (e.g., titanium dioxide, $CaCO_3$), thickeners, leveling agents, pH adjusting agents, surfactants, antifreeze agents and the like. Voided latex particles may be present in such coating compositions at levels of, for example, 0.5 to 10 weight percent.

The film-forming latex polymer used in combination with the voided latex particles of the present invention may also be selected such that it also contains functional groups which help to modify or enhance certain characteristics of the coating composition, such as wet adhesion, scrub resistance, solvent resistance, stain resistance or the like. For example, the film-forming latex polymer may be a polymer prepared by polymerization of a so-called wet adhesion monomer, optionally in combination with one or more other types of comonomers. The wet adhesion monomer may be, for instance, an ethylenically unsaturated compound bearing a urea, ureido, 1,3-diketo, amino or other such functional group. Such functionalized film-forming latex polymers are well known in the art and are described, for example, in U.S. Pat. Nos. 3,935,151; 3,719,646; 4,302,375; 4,340,743; 4,319,032; 4,429,095; 4,632,957; 4,783,539; 4,880,931; 4,882,873; 5,399,706; 5,496,907; and 6,166,220, each of which is incorporated herein by reference in its entirety for all purposes.

In one embodiment of the invention, a film-forming latex polymer is selected for use in a coating composition in combination with the non-film-forming voided latex particles described herein wherein the film-forming latex polymer contains functional groups capable of interacting with the functional groups present in the outer shell of the non-film-forming voided latex particles so as to provide a crosslinking effect. Such crosslinking effect may result when the coating composition is applied to a substrate surface and dried, for example. This interaction typically takes place through chemical reaction between the two types of functional groups resulting in the formation of covalent bonds, although the interaction could alternatively be the result of a non-covalent association such as complexation or formation of a salt. The opacity and solvent resistance of the coating may, for example, be enhanced through the use of such functionalized film-forming latex polymer and functionalized non-film-forming voided latex particles in combination with each other.

Examples of pairs of functional groups capable of interacting with each other are as follows. Functional Group A may be on the non-film-forming voided latex particles (as part of the outer shell polymer) and Functional Group B may be present in the film-forming latex polymer component. Alternatively, Functional Group A may be present in the film-forming polymer and Functional Group B may be present in the outer shell of the non-film-forming voided latex particles.

| Functional Group Pair | Functional Group A | Functional Group B |
|---|---|---|
| 1 | Carbonyl | Hydrazide |
| 2 | Epoxy | Amine |
| 3 | Oxazoline | Aldehyde |
| 4 | Acetoacetyl | Amine |

In yet another embodiment of the invention, the coating composition is formulated so as to contain one or more non-polymeric compounds bearing two or more functional groups per molecule capable of interacting with the functional groups present in the outer shell of the non-film-forming voided latex particles. Such non-polymeric compounds thus also may function as crosslinking agents. For example, where the outer shell contains acetoacetate groups, a non-polymeric compound containing a plurality of primary amine groups on each molecule may be employed.

In still another embodiment, the functional groups present in the outer shell of the non-film-forming voided latex particles are selected so as to be capable of condensing with each other thereby forming linkages between different particles. For instance, the outer shell may bear —Si(OH)$_3$ functional groups which may undergo a dehydration reaction to form a siloxane linkage (e.g., —Si(OH)$_2$—O—Si(OH)$_2$—).

In a preferred embodiment, the process does not include ammonia as a swelling agent, i.e., rendering the process "ammonia-free".

Example (Prophetic)

Multi-stage emulsion polymer particles and voided latex particles are prepared by the following process as depicted in FIG. 1. In Step 1, methyl methacrylate (MMA) is homopolymerized to form seed 1 as a small particle comprised of polymethyl methacrylate. Seed 1 is coated with a layer of methyl methacrylate/methacrylic acid copolymer by copolymerization of methyl methacrylate (MMA) monomer and methacrylic acid (MAA) monomer to provide core 2 (Step 2). In Step 3, encapsulating polymer layer 3 is formed by copolymerization of styrene (S) monomer and methyl methacrylate (MMA) monomer. During the formation of encapsulating layer 3, polymerization initiator is added prior to addition of swelling agent to reduce the amount of monomer present to less than 0.5% monomer based on the weight of the multi-stage emulsion polymer particles. A multi-stage emulsion polymer particle 7 is obtained following Step 3. Multi-stage emulsion polymer particle 7 is contacted with aqueous sodium hydroxide in Step 4. Although sodium hydroxide is added during step 4, substantially all of the swelling of the particle occurs during polymerization of monomer in step 5. The sodium hydroxide acts as a swelling agent during copolymerization of styrene (S) monomer or copolymerization of styrene monomer and a functionalized monomer (S/FM) such as an imidazolidinone (meth)acrylic monomer. The carboxylic acid functional groups of the MMA/MAA copolymer of core 2 are at least partially neutralized and core 2 swells in volume as a result of absorption of water by neutralized core 2. The volume increase of core 2 pushes encapsulating polymer layer 3 and outer shell 4 outwardly and the overall diameter of the multi-stage emulsion polymer particle increases. Drying the particles in Step 6 provides voided latex particle 6. Voided latex particle 6 is characterized by having an outer shell 4 surrounding hollow interior 5. Residues of seed 1 and core 2 may still be present within hollow interior 5. In this embodiment, encapsulating polymer layer 3 is capable of functioning as a tie-coat between core 2 and outer shell 4, which is formed in Step 4 by copolymerization of styrene (S) monomer and a functionalized monomer (FM) such as an imidazolidinone (meth)acrylic monomer. In other embodiments, the functionalized monomer may be omitted, and encapsulating polymer layer 3 may be omitted. More than one encapsulating polymer layer between core layer 2 and outer shell 4 may be present, if so desired.

The invention claimed is:

1. A process for forming voided latex particles, wherein the process comprises contacting multi-stage emulsion polymer particles comprising a core, at least one intermediate shell partially or fully encapsulating the core, with a swelling agent, adding a sufficient amount of polymerization initiator prior to said contacting with swelling agent to reduce the amount of monomer present during the contacting with swelling agent to less than 0.5% monomer based on the weight of multi-stage emulsion polymer particles, and polymerizing an outer shell after said contacting with swelling agent wherein:

the core comprises a polymer seed comprising methyl methacrylate and a seed coating of copolymerized methacrylic acid and methyl methacrylate, wherein at least one component of said seed is hydrophilic;

the at least one intermediate shell comprises, as polymerized units, one or more hydrophilic monoetheylenically unsaturated monomer, one or more nonionic monoethylenicaally unsaturated monomer, or mixtures thereof, the outer shell comprises a polymer having a Tg of at least 60° C., the core and the at least one intermediate shell are contacted with swelling agent in the presence of less than 0.5% monomer based on the weight of the multi-stage emulsion polymer particles, and;

substantially all of the swelling occurs during polymerization of the outer shell.

2. The process of claim 1, wherein the initiator is a free radical initiator.

3. The process of claim 1, wherein the initiator is a redox polymerization initiator.

4. The process of claim 1, wherein the at least one intermediate shell further comprises a cross linked polymer.

5. The process of claim 1, wherein the swelling agent is sodium hydroxide.

6. The process of claim 1, comprising a first intermediate layer comprises a copolymer of methacrylic acid, styrene, and methyl methacrylate.

7. The process of claim 6, further comprising a second intermediate layer comprising copolymerized methyl methacrylate and styrene.

8. The process of claim 1, wherein the outer shell is polymerized styrene.

9. The process of claim 1, wherein the other shell is copolymerized styrene and one more functionalized monomers.

10. A process for forming voided latex particles, wherein the process comprises contacting multi-stage emulsion polymer particles comprising a core, at least one intermediate shell, with a swelling agent, adding a sufficient amount of polymerization initiator prior to said contacting with swelling agent to reduce the amount of monomer present during the contacting with swelling agent to less than 0.5% monomer based on the weight of the multi-stage emulsion polymer particles, and polymerizing an outer shell after said contacting with swelling agent wherein the core and the at least one intermediate shell are contacted with swelling agent in the presence of less than 0.5% monomer based on the weight of the multi-stage emulsion polymer particles, and substantially all of the swelling occurs during polymerization of the outer shell, wherein the core comprises a polymer seed comprising methyl methacrylate and a seed coating of copolymerized methacrylic acid and methyl methacrylate.

11. The process of claim 10, wherein the at least one intermediate shell fu C comprises a cross linked polymer.

12. The process of claim 10, wherein the swelling agent is sodium hydroxide.

13. The process of claim 10, comprising a first intermediate layer comprises a copolymer of methacrylic acid, styrene, and methyl methacrylate.

14. The process of claim 13, further comprising a second intermediate layer comprising copolymerized methyl methacrylate and styrene.

15. The process of claim 10, wherein the outer shell is polymerized styrene.

16. The process of claim 10, wherein the other shell is copolymerized styrene and one more functionalized monomers.

* * * * *